Oct. 1, 1963     N. C. JECKEL     3,105,492
SYNTHETIC BLOOD VESSEL GRAFTS
Filed Oct. 1, 1958
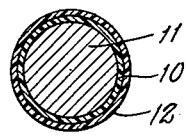
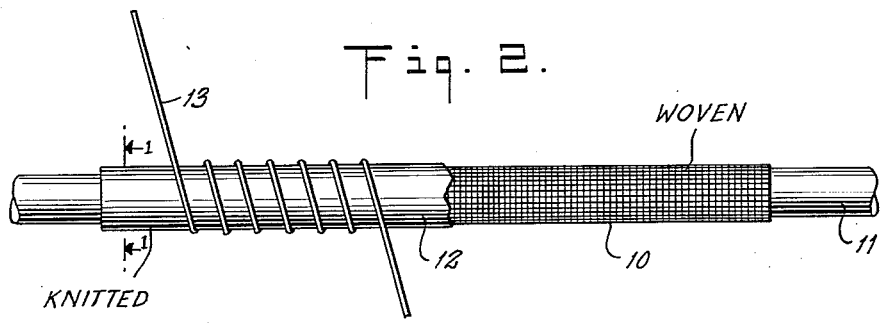
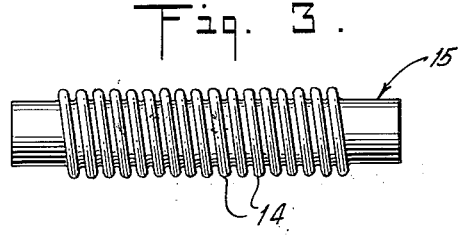
INVENTOR.
NORMAN C. JECKEL
BY Corey, Hart & Stemple
ATTORNEYS United States Patent Office 3,105,492
Patented Oct. 1, 1963

3,105,492
SYNTHETIC BLOOD VESSEL GRAFTS
Norman C. Jeckel, Glens Falls, N.Y., assignor to United States Catheter & Instrument Corporation, Glens Falls, N.Y., a corporation of New York
Filed Oct. 1, 1958, Ser. No. 764,527
5 Claims. (Cl. 128—334)

This invention relates to improvements in artificial blood vessel grafts and is more particularly concerned with multi-layered grafts and grafts having smooth and uniform corrugations.

The recent expansion of vascular surgery has increased the need for blood vessel substitutes, particularly arteries, and artery banks have been established for this purpose. Homografts (natural blood vessels) have been used to a certain extent but such use is greatly restricted by limited supply, time and expense that is connected therewith. Since the supply of homografts is limited, it is extremely difficult to match the varieties of size and shapes of blood vessels that may be necessary during surgery, the size of which may not be known prior to surgical entry.

The normal blood vessel is an extremely tough and resilient organ which must be flexible and elastic but at the same time strong and non-collapsible. The varied properties of the normal blood vessel is particularly emphasized at the joints having an extensive range of movement, e.g., the hip joint between the legs and the primary body trunk. In fact, one of the common but difficult locations for blood vessel substitution has been the aortic bifurcation where the aorta divides into the iliac arteries to supply each leg.

It was only natural that attempts be made to secure synthetic blood vessels to be used on a surgical basis. Many materials have been suggested but nylon (polyhexamethylene adipamide) appears to be the first to have been utilized on a commercial basis. Since that time other materials have been developed or suggested, including "Dacron" (DuPont trademark for polyethylene glycol terephthalate), "Orlon" (DuPont trademark for polyacrylonitrile) and "Teflon" (DuPont trademark for tetrafluoroethylene resin). Various other materials have been suggested, but these have been the leading ones.

Of these presently used materials, it has been found that Teflon causes the least tissue reactivity, retains greater strength over a period of time, heals more rapidly as a graft, exhibits a lower rate of thrombosis and occlusion and causes formation of a thinner fibrous layer in the internal bore, than any of the other materials. Thus, at the present time, Teflon is the preferred material.

The first blood vessel grafts on the market were generally made from nylon filaments, which could be braided, knitted or woven. However, these were subject to collapse generally and kinking particularly on flexion of the graft. There was then developed a crimped or corrugated nylon graft (generally braided) to resist collapse and kinking. The corrugations were formed by placing a nylon tube on a rod and pushing the ends towards each other. The tube is then treated by heat or chemicals to set the corrugations so that they will be retained.

However, the grafts prepared by this method (which are commercially available today) have quite irregular corrugations which are also quite rough and sharp and thus will serve to irritate surrounding tissues where the artificial graft is placed. Thus Harrison pointed out (95 American Journal of Surgery 3, 1958) that the marked inflammatory reaction incited by nylon which was more prevalent with the crimped tubes eliminated much of the non-buckling advantage of the crimped tubes.

A woven or braided graft can be tightly woven so that the porosity is minimal and thus avoid external preclotting of the graft before insertion into place. However, the woven and braided grafts are not fray-resistant at cut edges and thus offer more difficulty in suturing, as the stitches must be farther removed from the cut edges. It has been found that knitted grafts are much more fray-resistant at cut edges and are thus preferable for suturing, as the stitches may be made relatively close to the cut edge. However, a knitted graft is relatively porous so that external preclotting was advisable to avoid loss of blood after insertion of a graft. Both of these problems, namely, greater porosity in the knitted grafts and difficulty in suturing the woven and braided grafts, are greater in dealing with larger blood vessels where the resultant strain on the graft is greater.

It is an object of this invention to provide corrugated or crimped synthetic blood vessel grafts wherein the corrugations are smooth and uniform in dimension.

It is also an object of this invention to provide a process for corrugating said grafts whereby the spacing and height of the corrugations can be readily controlled.

It is an additional object of this invention to provide a graft formed of a plurality of laminated fabric tubes.

It is a further object of this invention to provide a graft formed of a plurality of laminated fabric tubes where one tube is formed by a different method of intertwining the threads thereof than another of the tubes.

It is another object of this invention to provide a graft formed of a pair of laminated fabric tubes wherein one tube is a knitted fabric and the other tube is a woven or braided fabric.

I have found that uniform and smooth corrugations may be formed on a flexible synthetic tube by wrapping same with a filament at spaced intervals and thereafter pushing the ends of the tube toward each other on a cylindrical rod. The filament may be a Teflon thread, thin wire, or most any flexible filament but must not react with the tube or have any other reactions during the process that will contaminate the artificial graft. The spacing and height of the corrugations will be largely controlled by the space between succeeding spirals of the filament and the extent to which the tube is shortened by pushing of the two ends toward each other.

It is necessary, of course, to fix the corrugations, which can be done by heat, chemical treatment, coatings or by any other methods used to fix the particular material involved.

I have found that an improved graft can be formed if a plurality of laminated tubes are provided. It is preferable that one tube be woven or braided and another be knitted. Such a preferred graft has both the advantages of low porosity and good suturing characteristics.

With the above objects and others in view, the nature of which will be more apparent, the invention will be more fully understood by reference to the accompanying detailed description and the appended claims.

In the drawings:

FIG. 1 is a transverse section taken along line 1—1 of FIG. 2;

FIG. 2 is a perspective view of a graft prior to corrugation with a portion broken away to show the inner layer; and FIG. 3 is a perspective view of a final laminated graft in accordance with this invention.

This invention, as will be described here in detail, is embodied in a corrugated white Teflon tubing which is to be utilized in substituting grafts for blood vessels.

A knitted tube of Teflon is placed on a stainless steel rod and is then wrapped with a Teflon thread at about eight revolutions per inch. Then the ends of the tube are pushed toward each other so that the length is reduced about fifty percent, whereby uniform and regular corrugations are formed between the successive thread revolutions. The corrugations are then fixed by heating the entire unit to about 580–610° F. which is near the softening point of Teflon. Such a heat treatment not only sets the corrugations but reduces the porosity of the tube and increases the tightness of the knit. Thereafter, the fixed tube is cooled, the Teflon filament and the stainless steel rod removed to leave the corrugated member which is ready for use by the surgeon after sterilization which may be done by autoclaving, soaking in alcohol, etc. but will be done at approximately the same time as the surgery. The process and product described in this paragraph in detail is illustrated in the drawings of my copending application, Serial No. 752,370, filed July 31, 1958, now abandoned, the present application being a continuation-in-part thereof.

The tube described in the previous paragraph was a knitted tube which has a high porosity relative to woven or braided tubes. The porosity of the knitted tube is reduced somewhat by the specific heat treatment described and by knitting the initial tube as tightly as possible. However, the porosity is still somewhat of a problem so that external preclotting of the graft is advisable before placement in a patient by dipping the tube into 50 cc. of the patient's own blood without permitting any of the blood to enter the lumen of the tube.

As pointed out before, this porosity disadvantage can be overcome by weaving or braiding the threads of the graft, as it is possible to weave a much less porous fabric than to knit one. A tightly braided tube is somewhat more porous than a tightly woven tube but markedly less porous than a knitted tube. However, the woven or braided graft has the disadvantage that the cut ends will fray and will not hold suture stitches as near to the cut edges as will the knitted tubes. It is therefore, desirable to have a tube that will combine the properties of the knitted and woven tubes, i.e., diminished porosity and better suturing characteristics.

I have devised a tube having these combined and desired properties. A woven tube 10 is first placed on a stainless steel rod 11 and then a knitted tube 12 of slightly larger diameter is placed over the woven tube 10. Thereafter, the combined multi-layered tube is treated as described hereinbefore for the single layered knitted tube, i.e., wrapped with a Teflon filament 13, the length reduced to form uniform corrugations 14 and those corrugations fixed by heating.

In this manner I have obtained a graft 15 which need not be externally preclotted because of the tightly woven layer and yet has excellent suturing characteristics because of the knitted layer. It will be appreciated, of course, that the inner and outer tubes may be reversed and that more than two tubes may be utilized, if desired. Moreover, a plurality of tubes in an arterial graft may be utilized without corrugations and particularly in those situations where flexion or collapse of the substituted artery is not a problem, The different tube fabrics in a given graft may be made from different materials or by different processes of intertwining the thread or the different tubes may be made of the same material and by the same process. In this latter instance, the purpose of the multi-layers might be, for example, to add strength to the graft or to provide for carrying some substance between layers.

I prefer to use a white purified Teflon tube because of the low reactivity of the purified Teflon. However, my novel methods for forming grafts may be used on any flexible tubing whether formed from Teflon, nylon, Orlon, Dacron and other materials or by knitting, weaving, braiding, extrusion or any other process for forming a flexible tube. The term "intertwined threads" is intended to be generic to knitting, weaving, braiding and also other processes for forming fabrics from threads or filaments.

A Teflon filament has been used for wrapping the tube because it was readily available and inert to the materials involved. Any thread, wire or filament could be used as long as it does not react detrimentally during the process.

The fixing of the corrugations may be done in various ways, depending somewhat on the material of the tube. Nylon tubes are commonly set with 70 to 73% formic acid. A coating such as silicone or fluorocarbon resins may be used for any of the materials. When fixing by heating to the softening point, it will be found that the range is quite broad for a given material. Thus Teflon is from 450 to 625° F. and nylon and Dacron from 200 to 310° F.

The grafts may be made in Y, T or other shapes if needed, the aortic bifurcation being a common Y-shape graft that is desired.

The height and spacing of the corrugations will be controlled by various factors such as the reduction in length of the original tube, size and spacing of the wrapping, filament, material and method of forming the tube, etc., as will be readily apparent to those in the art. I have found that a 35 to 65% reduction of the original tube length will generally provide satisfactory corrugations.

The tubes are made with inside diameters from about 3/16 to 1¼ inches. Below 3/16, the tube is apt to be closed by a thin lining of fibrin that is always deposited. Since the human aorta is only about 1¼ inches in diameter, there is little need for a larger size.

The corrugations range from 4 to 30 per inch in the set tube, generally being less with increased diameter. The most common range is about 15 to 18 per inch on about a 3/8 inch diameter tube.

As pointed out hereinbefore, any of the graft tubular material may be formed by my process but it is apparent that purified or white Teflon is the preferred material to be used in producing grafts. The Teflon, before or after tube formation, may be purified as disclosed in my copending application, Serial No. 752,370.

I claim:

1. A blood vessel graft comprising a pair of laminated fabric layers forming a tube in corrugated form, one of said layers being a knitted fabric and the other of said layers being a braided fabric.

2. A blood vessel graft comprising a pair of fabric layers forming a tube in corrugated form, one of said layers being a knitted fabric and the other of said layers being a woven fabric.

3. A graft as claimed in claim 2 wherein said fabric layers are made of a material selected from the group consisting of polytetrafluoroethylene, polyethylene glycol terephthalate, polyacrylonitrile and polyhexamethylene adipamide.

4. A graft as claimed in claim 3 wherein said material is polytetrafluoroethylene.

5. A graft as claimed in claim 4 wherein said knitted layer is exterior to said woven layer.

(References on following page)

References Cited in the file of this patent

UNITED STATES PATENTS

| | | |
|---|---|---|
| 1,050,442 | Frissell | Jan. 14, 1913 |
| 1,940,868 | Kennedy | Dec. 26, 1933 |
| 1,972,755 | Blaisdell | Sept. 4, 1934 |
| 2,127,903 | Bowen | Aug. 23, 1938 |
| 2,728,356 | Brinsmade et al. | Dec. 27, 1955 |
| 2,743,759 | Snow et al. | May 1, 1956 |
| 2,754,848 | Knowland et al. | July 17, 1956 |
| 2,780,274 | Roberts et al. | Feb. 5, 1957 |
| 2,833,313 | Penman | May 6, 1958 |
| 2,836,181 | Tapp | May 27, 1958 |
| 2,897,603 | Behrman | Aug. 4, 1959 |
| 2,898,941 | Kilays | Aug. 11, 1959 |
| 2,990,605 | Demsyk | July 4, 1961 |

OTHER REFERENCES

"The Use of Plastic Fabrics as Arterial Prostheses" by Poth, Johnson and Childers, Annals of Surgery, volume 142 (1955) pp. 624–631.